INVENTORS
YASUO SUZUKI
BY YASUYOSHI KAMEYAM

Wolfe, Hubbard, Voit & Osann
ATTYS

March 24, 1970  YASUO SUZUKI ET AL  3,502,921

SELF-STARTING SYNCHRONOUS MOTORS

Filed Sept. 27, 1967  2 Sheets-Sheet 2

INVENTORS
YASUO SUZUKI
BY YASUYOSHI KAMEYAMA

Wolfe, Hubbard, Voit & Osann
ATTYS.

United States Patent Office 3,502,921
Patented Mar. 24, 1970

3,502,921
SELF-STARTING SYNCHRONOUS MOTORS
Yasuo Suzuki and Yasuyoshi Kameyama, Kadoma-shi, Osaka, Japan, assignors to Matsushita Denko Kabushiki Kaisha, Osaka, Japan, a corporation of Japan
Filed Sept. 27, 1967, Ser. No. 670,850
Claims priority, application Japan, Sept. 29, 1966, 41/64,585
Int. Cl. H02k 17/10
U.S. Cl. 310—172                                     6 Claims

ABSTRACT OF THE DISCLOSURE

A synchronous motor having a permanent magnet rotor and a stator having as many magnetic pole teeth as rotor poles. The stator is formed in two parts with the pole teeth of one part meshing with the pole teeth of the other part, with an equal number of shaded and unshaded poles. The magnetic pole tooth in the foremost position in the direction of rotation of the rotor in the shaded pole group, and the magnetic pole tooth in the rearmost position in the unshaded pole, in the border of the shaded and unshaded pole groups, are made shorter than the other magnetic pole teeth and are butted close to each other so that magnetic fluxes of opposite polarities may be partly short-circuited.

---

This invention relates to a small synchronous motor wherein a stator for a synchronous motor having a permanent magnet as a rotor is improved so that the permanent magnet rotor may be electrically positively self-started in any desired direction and which has especially excellent perfomances as a motor for clock mechanisms, timing mechanisms and constant speed driving mechanisms.

Generally, among inductor type motors of this kind having a permanent magnet as a rotor, a hysteresis type motor or an induction type motor starts while lagging behind a rotary magnetic field generated by a stator pole, gradually approaches a synchronous speed and reaches the synchronous speed while varying its hysteresis loop or rotates while slipping at a certain speed in response to a load.

However, the so-called inductor type motor having a permanent magnet as a rotor starts and continues to rotate due to the mutual force of a magnetic flux generated by the stator pole and a magnetic flux generated by the rotor pole and therefore can not rotate at any other speed than a constant speed determined by the frequency of the electric source and the number of poles of the motor.

Therefore, the synchronous speed must be reached simultaneously with the driving. Therefore, by the mutual relations in both time and space positions between the magnetic flux of an unshaded pole and the lag magnetic flux of a shaded pole, a strong torque in one direction must be compensated for a so-called time instant for the permanent magnetic rotor.

For the condition of the compensation from both time and space positions, as already known, it is necessary to deviate the shaded pole in the direction of the magnetic flux phase lag for the unshaded pole so much as to be equivalent substantially to the supplementary angle of the magnetic flux phase lag angle.

By adopting a novel stator pole arrangement while satisfying such basic condition of the deviation, the present invention has been successful in having the following various features.

An object of the present invention is to provide a motor having the following features that the number of stator poles is the same as the number of rotor poles, that both unshaded pole and shaded pole extend from one soft magnetic member, that the stator poles are divided into an unshaded pole group and a shaded pole group and the numbers of the respective groups are the same, that each group has the same number of magnetic pole teeth, that therefore the total number of the unshaded poles and that of the shaded poles are the same, that the upper and lower arrangements of the magnetic pole teeth extending from two upper and lower stator members are exactly the same, that exactly the same parts can be applied to the respective shading members inserted into the upper and lower stators, that, as the direction of the rotation of the rotary magnetic field can be reversed by changing the inserting position of the shading member, it is possible to easily and positively change the direction of the rotation of the rotor and that a strong motor which is very low in the number of parts, is cheap in price and is high in reliability that can be obtained.

Figure 1:
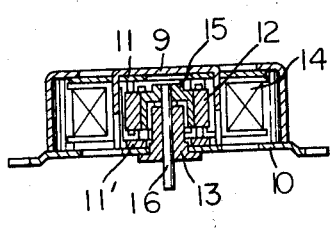
FIGURE 1 is a sectioned view showing the formation of a synchronous electric motor.
Figure 2:
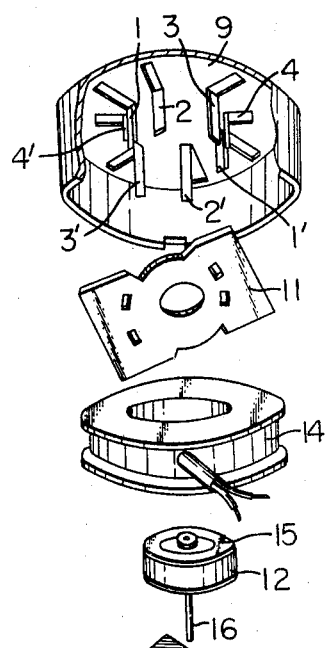
FIGURE 2 is a partly sectioned perspective view as disassembled.
Figure 3:
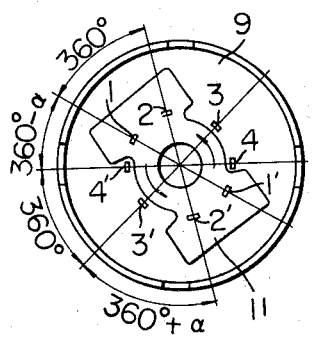
FIGURE 3 is a plan view of an upper stator half.
Figure 4:
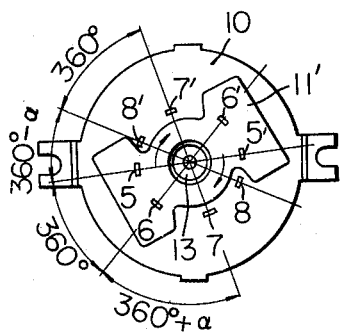
FIGURE 4 is a plan view of a lower stator half.
Figure 4:
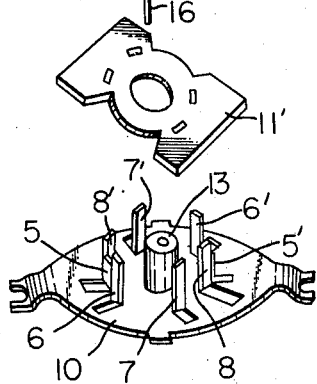

The present invention shall be explained in the following with reference to its preferred embodiment. But it should be understood that the present invention is not to be limited to the specific embodiment shown here but is to include arrangements equal to various modifications to be included in the claims and their spirit.

An embodiment of the invention in which the motor has sixteen motor poles shall be explained in detail herein.

In a synchronous motor having a permanent magnet as a rotor, as shown in FIGURES 1 to 4, an upper stator 9 and a lower stator 10 are made by arranging and providing magnetic pole tooth pairs 1–1′, 2–2′, 3–3′, 4–4′ and 5–5′, 6–6′, 7–7′, 8–8′ respectively on a cylindrical iron plate and a disk-shaped iron plate so as to be symmetrical with respect to the center and to be on the same periphery by punching and raising them on the substantially disk-shaped iron plates. Then, shading disks 11 and 11′ made by making through holes in advance in copper plates are fitted to the magnetic pole teeth 1–1′, 2–2′ and 5–5′, 6–6′, respectively. In short, when the number of motor poles of the motor of this embodiment is represented by $2n$, here $2n=16$, each of the upper and lower stators is provided with $n$ magnetic pole teeth equal to half of the number of motor poles, here $n=8$. Half of said $n$ magnetic teeth are fitted with a shading disc to provide $n/2$ shade magnetic pole teeth, here $n/2=4$. An electric motor stator is formed by assembling the upper and lower stators 9 and 10 so that the magnetic pole teeth to which these shading disks are fitted may be magnetic poles electrically lagging in the phase with respect to the other pole teeth 3–3′, 4–4′, and 7–7′, 8–8′ and that the pole teeth may mesh with each other. Within the stator, a permanent magnetic rotor 12 on the outer periphery of which a total of 16 stator poles are magnetically fixed so that magnetic poles N and S may be alternate is rotatably held by a bearing 13 with a proper air gap on the inner peripheral side of the stator pole teeth. 15 is a supporter of a nonmagnetic material fixing the permanent magnetic rotor 12 and a rotor shaft 16. 14 is an exciting coil connected to an alternating current source so as to alternately excite the stator poles. Further, the magnetic pole teeth provided with the shading disks and the other magnetic pole teeth are divided into 4 shaded pole groups and unshaded pole groups so that the numbers of the magnetic pole teeth of the shaded poles and unshaded poles may be equal. Further, in the upper and lower stator pole tooth arrangements in which all the magnetic pole tooth spacings are deviated by an electric angle of 360 degrees, the permanent magnetic rotor can not be self-started in one direction and therefore, when the supplementary angle of the phase lag $\beta$ by the shading for the unshaded pole of the same polarity in the direction of the rotation of the rotor is $\alpha$, it will be necessary to deviate the shaded pole by an electric angle corresponding to $360° \times n + \alpha$ (wherein $n = 0, 1, 2, \ldots$) or to deviate the unshaded pole by an electric angle corresponding to $360° \times n - \alpha$ for the shaded pole of the same polarity in the direction of the rotation of the rotor. Further, it is necessary that the adjacent unshaded poles or shaded poles themselves of the same polarity should be arranged at a spacing of an electric angle of 360 degrees. When, as in FIGURE 5, the electric angle between the unshaded poles 3 and 4 of the upper stator 9 is 360 degrees, the electric angle between the shaded poles 1 and 2 is also 360 degrees, the electric angle between the shaded pole 2 and unshaded pole 3 is $360° + \alpha$ and this $\alpha$ is taken for the supplementary angle of the phase lag $\beta$ for the unshaded pole of the shaded pole by the shading, the rotor will be able to be started in one direction and further, when the electric angle between the unshaded pole 4 and shaded pole 1' is taken to be $360° - \alpha$, the direction of the rotation will be able to be made the same as in the case of taking the electric angle between the shaded pole 2 and unshaded pole 3 to be $360° + \alpha$, that is, the direction indicated by the arrow in the drawing. Here, as the phase lag $\beta$ by the shading is, in fact, an electric angle of 20 to 60 degrees, the electric angle between the unshaded pole 4 and shaded pole 1' will be 200 to 240 degrees and the electric angle between the shaded pole 2 and unshaded pole 3 will be 480 to 520 degrees. The area of the shading disk surrounding the peripheries of the shaded poles 1' and 2 is taken to be sufficient, the shaded poles 1 and 2' are also made exactly the same and the lower stator half 10 has magnetic pole teeth arranged in exactly the same manner as in the upper stator half 9 in FIGURE 2 as seen from the back side so that a shaded synchronous motor may be formed.

However, when, as mentioned above, the spacing between the shaded pole and unshaded pole is of only two kinds of $360° + \alpha$ and $360° - \alpha$ in the arrangement and the number of magnetic pole teeth forming the shaded pole and the number of magnetic pole teeth forming the unshaded pole are made the same in the arrangement, in the border of the shaded pole part and unshaded pole part, one pole in the foremost position in the direction of the rotation of the rotor in the shaded pole group and one pole in the rearmost position in the direction of the rotation of the rotor in the unshaded pole group will overlap on each other. Therefore, in order to avoid it, the overlapping magnetic pole teeth of the unshaded pole have been cut off to form a stator pole. Therefore, there have been defects that the number of the magnetic pole teeth of the unshaded pole will be less than the number of the magnetic pole teeth of the shaded pole, the magnetic flux of the unshaded pole and the magnetic flux of the shaded pole will be unbalanced, the rotary magnetic field will become elliptic and the startability and rotatability of the rotor will become very unstable.

The present invention has been suggested to eliminate the above mentioned defects and has it as an object to simply eliminate the conventional defects by making one pole in the foremost position in the direction of the rotation of the rotor in the shaded pole group and one pole in the rearmost position in the direction of the rotation of the rotor in the unshaded pole group shorter than other magnetic pole teeth in the border of the shaded pole group and unshaded pole group and butting them to each other so that the magnetic fluxes of the opposite polarities may be partly short-circuited.

Figure 5:
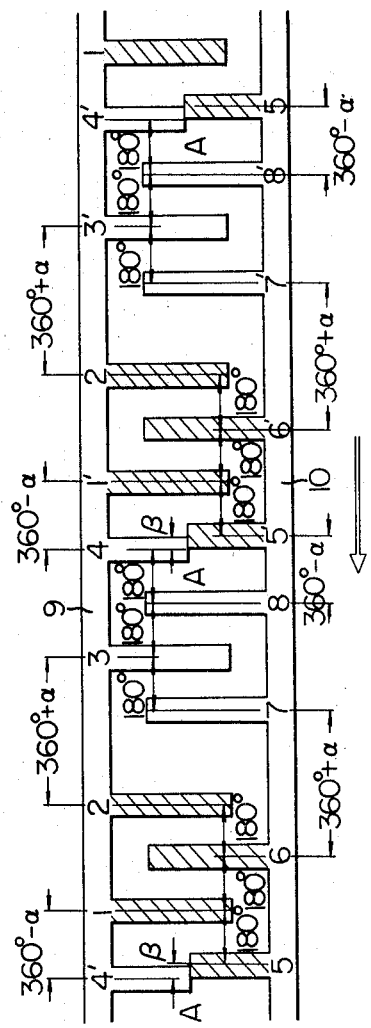
FIGURE 5 is a developed view showing an arrangement of stator poles.
Figure 6:
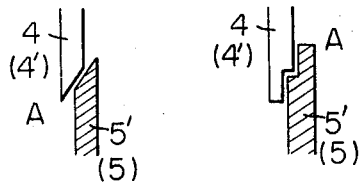
FIGURES 6 and 7 are magnified elevations of a set of upper and lower stator poles as butted to each other.
Figure 7:
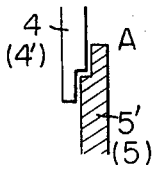
Figure 8:
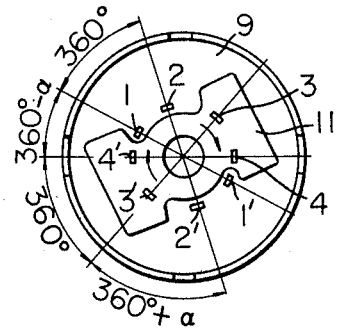
FIGURES 8 and 9 are plan views of upper and lower stator halves in case the direction of the rotation is reversed by changing the shading disk inserting position.
Figure 9:
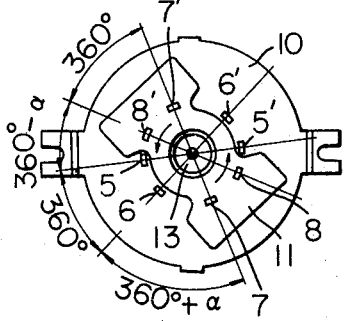

FIGURE 5 is a developed view of stator poles embodying the present invention in which the number of motor poles is 16, i.e. $2n = 16$ and, and direction of the rotation of the rotor being indicated by the arrow in the drawing. 1-1', 2-2', 3-3' and 4-4' are magnetic pole teeth formed by punching and raising a stator iron plate 9 of an upper stator half. 5-5', 6-6', 7-7' and 8-8' are magnetic pole teeth formed by punching and raising a stator iron plate 10 of a lower stator half. Thus, each of the upper and lower stator halves is provided with 8 magnetic pole teeth, i.e., $n = 8$. 1-1', 2-2' and 5-5', 6-6' are shaded poles fitted with shading plates and deviated so that the respective phases may lay with respect to other magnetic pole teeth and are shown as hatched. Thus, alternate pairs of adjacent magnetic pole teeth on each of the stator halves are shaded to provide four shaded pole teeth on each stator half, i.e., $n/2 = 4$. The others shown are unshaded poles. The magnetic pole is formed of a total of four shaded pole groups and unshaded pole groups as divided. The number of the magnetic pole teeth of the shaded pole and the number of the magnetic pole teeth of the unshaded pole are made equal in the arrangement. In the border A of the shaded pole group and the unshaded pole group, the magnetic pole teeth 5 and 5' in the foremost position in the direction of the rotation of the rotor in the shaded pole group and the magnetic pole teeth 4 and 4' in the rearmost position in the direction of the rotation of the rotor in the unshaded pole group are made shorter than other magnetic pole teeth. The magnetic pole teeth 4 and 5' and 4' and 5 of opposite polarities are respectively butted into contact with or close to each other so that the magnetic fluxes may be partly short-circuited. Further, instead of short-circuiting the magnetic fluxes by butting the magnetic pole teeth of the upper and lower stators of opposite polarities as shown in FIGURE 5, the magnetic fluxes may be short-circuited by butting them as shown in FIGURES 6 and 7.

As the present invention is formed as mentioned above:

(I) The same number of poles extend from each of the upper and lower stator halves and the total number of such poles coincides with the total number of the rotor poles.

(II) Such poles are divided into four unshaded pole groups and shaded pole groups and are alternately arranged and the number of poles in each group is the same.

(III) In each of the upper and lower stator halves, the spacing between the adjacent poles in each group is an electric angle of 360 degrees. The spacing between the unshaded pole in the foremost position in the direction of the rotation of the rotor in the unshaded pole group and the shaded pole adjacent to it is an electric angle of $360° + \alpha$ and the spacing between the shaded pole in the foremost position in the direction of the rotation of the rotor in the shaded pole group and the unshaded pole adjacent to it is an electric angle of $360° - \alpha$.

(IV) Of the 8 poles extending from the lower stator half, the two shaded poles in the foremost position in the direction of the rotation of the rotor in the shaded pole group are shorter than the other 6 poles. In the upper stator half, the two poles in the rearmost position in the direction of the rotation of the rotor in the unshaded pole group are shorter than the other 6 poles.

(V) The spacing between the adjacent poles in the unshaded pole group and shaded pole group in the case that the upper and lower stator halves are combined is an electric angle of 180 degrees.

(VI) When the upper and lower stator halvts are combined, each of the spacings between the above mentioned short unshaded poles and short shaded poles will be an electric angle of $180° - \alpha$, that is, an electric angle corresponding to a phase lag angle $\beta$ of the magnetic flux for the unshaded pole of the shaded pole. Therefore, these short poles can be arranged in contact with or close to each other.

As a result of arranging the poles as described above, the present invention has the following remarkable features:

(I) As the unshaded pole and shaded pole of opposite polarities can be spatially brought into contact with or close to each other, it is possible to magnetically partly short-circuit the magnetic fluxes of opposite polarities in such part, the higher harmonic parts of the magnetic fluxes in the stator poles can be automatically short-circuited, the deformation of the rotary magnetic field can be eliminated and both startability and rotary torque can be improved.

(II) The magnetic fluxes of the unshaded pole and shaded pole are balanced.

(III) The arrangements of the stator poles extending from the upper and lower stator halves are exactly the same and the cost of cutting and raising the poles can be reduced.

(IV) As exactly the same parts can be also applied for the upper and lower shading disks to be inserted into the upper and lower stator halves, the control of the parts can be improved, the cost can be reduced and the operation efficiency can be increased.

(V) As the direction of the rotary magnetic field can be reversed by changing the inserting position of the shading disk, the direction of the rotation of the rotor can be easily and positively changed.

What is claimed is:

1. In a synchronous motor wherein a rotor made of a permanent magnet and a stator arranged around said rotor are provided, said stator has as many magnetic pole teeth as rotor poles, said pole teeth are divided into four unshaded pole groups and shaded pole groups, the shaded poles are arranged as deviated by $360°+\alpha$, wherein $\alpha$ is an electric angle corresponding to the supplementary angle of the phase lag, by shading with respect to the unshaded pole of the same polarity in the direction of the rotation of the rotor, and the number of the magnetic pole teeth forming the unshaded poles and the number of the magnetic pole teeth forming the shaded poles are the same, a stator for synchronous motors characterized in that the magnetic pole tooth in the foremost position in the direction of the rotation of the rotor in the shaded pole group, and the magnetic pole tooth in the rearmost position in the direction of the rotation of the rotor in the unshaded pole group, in the border of the shaded pole group and unshaded pole group, are made shorter than other magnetic pole teeth with the opposed ends of said shorter poles cooperating with each other to at least partly short circuit magnetic fluxes of opposite polarities through said shorter poles.

2. A stator for synchronous motors according to claim 1 wherein the magnetic pole tooth in the foremost position in the direction of the rotation of the rotor in said shaded pole group and the magnetic pole tooth in the rearmost position in the direction of the rotation of the rotor in the unshaded pole group are butted to be in contact with each other.

3. A motor according to claim 1 comprising;

a rotor made of a permanent magnet in which $n$ pairs of magnetic poles N and S are arranged at spacings of an electric angle of 180 degrees;

an upper stator having $n$ magnetic teeth extended vertically to a member of soft magnetic iron on the same side on a periphery slightly larger than the outer periphery of said rotor from said member, said magnetic teeth being divided into four groups to form unshaded pole groups and shaded pole groups which are arranged alternately, the respective total numbers of the magnetic pole teeth in the unshaded pole group and shaded pole group being equal, the spacing between the adjacent magnetic pole teeth in each group being an electric angle of 360 degrees, the spacing between the magnetic pole tooth in the foremost position in the direction of the rotation of the rotor in the unshaded pole group and the magnetic pole tooth in the rearmost position in the direction of the rotation of the rotor in the shaded pole group adjacent to said magnetic pole tooth being an electric angle of $360°+\alpha$, the spacing between the magnetic pole tooth in the foremost position in the direction of the rotation of the rotor in the shaded pole group and the magnetic pole tooth in the rearmost position in the direction of the rotation of the rotor in the unshaded pole group being an electric angle of $360°-\alpha$, $\alpha$ being a supplementary angle of a phase lag angle for the unshaded pole magnetic flux of the shaded pole magnetic flux and all the magnetic pole teeth in the rearmost position in the direction of the rotation of the rotor in the unshaded pole group being shorter than other magnetic pole teeth;

a lower stator having $n$ magnetic teeth arranged on a periphery of the same diameter so as to be parallel with and to mesh with the magnetic pole teeth of said upper stator from another soft magnetic iron member, said magnetic teeth being divided into four groups to form unshaded pole groups and shaded pole groups which are arranged alternately, the respective total numbers of the magnetic pole teeth in the unshaded pole group and shaded pole group being equal, the spacing between the adjacent magnetic pole teeth in each group being an electric angle of 360 degrees, the spacing between the magnetic pole tooth in the foremost position in the direction of the rotation of the rotor in the unshaded pole group and the magnetic pole tooth in the rearmost position in the direction of the rotation of the rotor in the shaded pole group adjacent to said magnetic pole tooth being an electric angle of $360°+\alpha$, the spacing between the magnetic pole tooth in the foremost position in the direction of the rotation of the rotor in the shaded pole group and the magnetic pole tooth in the rearmost position in the direction of the rotation of the rotor in the unshaded pole group being an electric angle of $360°-\alpha$, $\alpha$ being a supplementary angle of a phase lag angle for the unshaded pole magnetic flux of the shaded pole magnetic flux, all the magnetic pole teeth in the rearmost position in the direction of the rotation of the rotor in the unshaded pole group being shorter than other magnetic pole teeth and said $n$ magnetic pole teeth arranged on each of said two soft magnetic iron members being so combined on the same periphery that the magnetic pole teeth of the unshaded pole group may mesh with the magnetic pole teeth of the unshaded pole group on the other side, that the magnetic pole teeth of the shaded pole group may mesh with the magnetic pole teeth of the shaded pole group on the other side and that the short magnetic pole teeth arranged on each soft magnetic iron member may be opposed to each other;

shading members arranged at the roots of $n/2$ shaded magnetic pole teeth formed on each of said soft magnetic iron members; and a coil arranged on said two soft magnetic iron members and surrounding $2n$ magnetic pole teeth slightly outside the periphery formed by said magnetic pole teeth, said coil being enclosed with a soft magnetic member on the outside and being magnetically short-circuited.

4. A motor according to claim 1 wherein $n$ magnetic pole teeth are formed on each of two soft magnetic iron members and are divided into four groups, the spacing between the adjacent unshaded pole and shaded pole in the border of the groups is either of only two kinds of so-called electric angles of $360°+\alpha$ and $360°-\alpha$ and the spacing form of the magnetic pole teeth is made exactly the same in the two magnetic iron members.

5. A motor according to claim 1 wherein the magnetic pole teeth formed on the two magnetic iron members are made in exactly the same spacing form, the shading members inserted into the two magnetic iron members are made in exactly the same shape and size and the direction of the rotation of the rotary magnetic field can be changed by changing the inserting position of the shading member.

6. A motor according to claim 1 wherein 8 stator poles are cut and raised on each of two soft magnetic iron members, two unshaded pole groups each having two poles as a set and two shaded pole groups each having two poles as a set are respectively arranged in diametrically opposite positions and a 16-pole permanent magnetic rotor is arranged in their center.

References Cited

UNITED STATES PATENTS

| | | | |
|---|---|---|---|
| 2,951,957 | 11/1957 | Eigeman | 310—172 |
| 2,981,855 | 4/1961 | Van Lieshout | 310—156 |
| 3,014,141 | 12/1961 | Riggs | 310—156 |
| 3,058,019 | 10/1962 | Eisler | 310—156 |
| 3,330,975 | 7/1967 | Osterwalder | 310—41 |
| 3,403,273 | 9/1968 | Higuchi | 310—41 |

MILTON O. HIRSHFIELD, Primary Examiner

R. SKUDY, Assistant Examiner

U.S. Cl. X.R.

310—156, 190